United States Patent
Byrd

(10) Patent No.: US 7,020,811 B2
(45) Date of Patent: Mar. 28, 2006

(54) SYSTEM AND METHOD FOR VERIFYING ERROR DETECTION/CORRECTION LOGIC

(75) Inventor: James M. Byrd, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 639 days.

(21) Appl. No.: 10/037,361

(22) Filed: Oct. 29, 2001

(65) Prior Publication Data

US 2002/0157044 A1   Oct. 24, 2002

(51) Int. Cl.
  *G06F 11/00*   (2006.01)
(52) U.S. Cl. .................. 714/703; 714/52; 714/746; 714/758
(58) Field of Classification Search ......... 714/703, 714/6, 746, 52, 724, 758, 752; 704/229
  See application file for complete search history.

(56) References Cited

U.S. PATENT DOCUMENTS

| | | | |
|---|---|---|---|
| 4,107,649 A * | 8/1978 | Kurihara ............... | 714/703 |
| 4,939,733 A | 7/1990 | Furutani | |
| 5,263,031 A | 11/1993 | Inoue | |
| 5,502,732 A * | 3/1996 | Arroyo et al. ............. | 714/746 |
| 5,619,642 A * | 4/1997 | Nielson et al. ............. | 714/6 |
| 5,809,332 A * | 9/1998 | Vishlitzky et al. ............. | 710/15 |
| 5,925,144 A | 7/1999 | Sebaa | |
| 6,003,151 A | 12/1999 | Chuang | |
| 6,446,037 B1 * | 9/2002 | Fielder et al. ............. | 704/229 |

* cited by examiner

*Primary Examiner*—Albert Decady
*Assistant Examiner*—Dipakkumar Gandhi
(74) *Attorney, Agent, or Firm*—Robert C. Kowert; Meyertons, Hood, Kivlin, Kowert & Goetzel, P.C.

(57) ABSTRACT

A method of testing error correction/detection logic may involve providing each of a set of n data bit combinations to the error correction/detection logic. Each data bit combination has n bits, and the n data bit combinations may be created by creating an initial data bit combination whose data bits have the same logical value and then shifting a bit having the opposite value across the initial data bit combination. In response to being provided with the n data bit combinations, the error correction/detection logic generates a set of check bits for each of the n data bit combinations. The set of check bits generated by the error correction/detection logic for each of the n data bit combinations may then be verified.

35 Claims, 19 Drawing Sheets

Check Bit Equations 22 c0 = d0 XOR d1 XOR d2
c1 = d0 XOR d1 XOR d3
c2 = d0 XOR d2 XOR d3

|  | Data Bits 12 | | | Check Bits 14 | | | |
|---|---|---|---|---|---|---|---|
| d0 | d1 | d2 | d3 | c0 | c1 | c2 | ← Table 30 |
| 0 | 0 | 0 | 0 | 0 | 0 | 0 | |
| 0 | 0 | 0 | 1 | 0 | 1 | 1 | |
| 0 | 0 | 1 | 0 | 1 | 0 | 1 | |
| 0 | 0 | 1 | 1 | 1 | 1 | 0 | |
| 0 | 1 | 0 | 0 | 1 | 1 | 0 | |
| 0 | 1 | 0 | 1 | 1 | 0 | 1 | |
| 0 | 1 | 1 | 0 | 0 | 1 | 1 | |
| 0 | 1 | 1 | 1 | 0 | 0 | 0 | |
| 1 | 0 | 0 | 0 | 1 | 1 | 1 | |
| 1 | 0 | 0 | 1 | 1 | 0 | 0 | |
| 1 | 0 | 1 | 0 | 0 | 1 | 0 | |
| 1 | 0 | 1 | 1 | 0 | 0 | 1 | |
| 1 | 1 | 0 | 0 | 0 | 0 | 1 | |
| 1 | 1 | 0 | 1 | 0 | 1 | 0 | |
| 1 | 1 | 1 | 0 | 1 | 0 | 0 | |
| 1 | 1 | 1 | 1 | 1 | 1 | 1 | |

*FIG. 4C*

| Data Bits 12 | | | | Check Bits 14 | | | |
|---|---|---|---|---|---|---|---|
| d0 | d1 | d2 | d3 | c0 | c1 | c2 | ← Table 40A |
| 0 | 0 | 0 | 1 | 0 | 1 | 1 | |
| 0 | 0 | 1 | 0 | 1 | 0 | 1 | |
| 0 | 1 | 0 | 0 | 1 | 1 | 0 | |
| 1 | 0 | 0 | 0 | 1 | 1 | 1 | |

*FIG. 4D*

| Data Bits 12 | | | | Check Bits 14 | | | |
|---|---|---|---|---|---|---|---|
| d0 | d1 | d2 | d3 | c0 | c1 | c2 | ← Table 40B |
| 0 | 1 | 1 | 1 | 0 | 0 | 0 | |
| 1 | 0 | 1 | 1 | 0 | 0 | 1 | |
| 1 | 1 | 0 | 1 | 0 | 1 | 0 | |
| 1 | 1 | 1 | 0 | 1 | 0 | 0 | |

*FIG. 4E*

Data Bits 12      Check Bits 14

|  d0 | d1 | d2 | d3 | c0 | c1 | c2 | c3 |
|---|---|---|---|---|---|---|---|
| 1 | 1 | 1 | 0 | 1 | 0 | 0 | 0 |
| 1 | 1 | 0 | 1 | 0 | 1 | 0 | 0 |
| 1 | 0 | 1 | 1 | 0 | 0 | 1 | 0 |
| 0 | 1 | 1 | 1 | 0 | 0 | 0 | 1 |
| (14) | (13) | (11) | (7) | (8) | (4) | (2) | (1) |

← Parity Check Matrix 20A

Encoded Value Of Each Column

Check Bit Equations 22A $c_0 = d_0 \text{ XOR } d_1 \text{ XOR } d_2$
$c_1 = d_0 \text{ XOR } d_1 \text{ XOR } d_3$
$c_2 = d_0 \text{ XOR } d_2 \text{ XOR } d_3$
$c_3 = d_1 \text{ XOR } d_2 \text{ XOR } d_3$

*FIG. 4G*

| Data Bits 12 | | | | Check Bits 14 | | | | 
|---|---|---|---|---|---|---|---|
| d0 | d1 | d2 | d3 | c0 | c1 | c2 | c3 |
| 0 | 0 | 0 | 0 | 0 | 0 | 0 | 0 |
| 0 | 0 | 0 | 1 | 0 | 1 | 1 | 1 |
| 0 | 0 | 1 | 0 | 1 | 0 | 1 | 1 |
| 0 | 0 | 1 | 1 | 1 | 1 | 0 | 0 |
| 0 | 1 | 0 | 0 | 1 | 1 | 0 | 1 |
| 0 | 1 | 0 | 1 | 1 | 0 | 1 | 0 |
| 0 | 1 | 1 | 0 | 0 | 1 | 1 | 0 |
| 0 | 1 | 1 | 1 | 0 | 0 | 0 | 1 |
| 1 | 0 | 0 | 0 | 1 | 1 | 1 | 0 |
| 1 | 0 | 0 | 1 | 1 | 0 | 0 | 1 |
| 1 | 0 | 1 | 0 | 0 | 1 | 0 | 1 |
| 1 | 0 | 1 | 1 | 0 | 0 | 1 | 0 |
| 1 | 1 | 0 | 0 | 0 | 0 | 1 | 1 |
| 1 | 1 | 0 | 1 | 0 | 1 | 0 | 0 |
| 1 | 1 | 1 | 0 | 1 | 0 | 0 | 0 |
| 1 | 1 | 1 | 1 | 1 | 1 | 1 | 1 |

Table 30A

*FIG. 4H*

| Data Bits 12 | | | | Check Bits 14 | | | | Table 40C |
|---|---|---|---|---|---|---|---|---|
| d0 | d1 | d2 | d3 | c0 | c1 | c2 | c3 | |
| 0 | 0 | 0 | 1 | 0 | 1 | 1 | 1 | |
| 0 | 0 | 1 | 0 | 1 | 0 | 1 | 1 | |
| 0 | 1 | 0 | 0 | 1 | 1 | 0 | 1 | |
| 1 | 0 | 0 | 0 | 1 | 1 | 1 | 0 | |

FIG. 4I

| Data Bits 12 | | | | Check Bits 14 | | | | Table 40D |
|---|---|---|---|---|---|---|---|---|
| d0 | d1 | d2 | d3 | c0 | c1 | c2 | c3 | |
| 0 | 1 | 1 | 1 | 0 | 0 | 0 | 1 | |
| 1 | 0 | 1 | 1 | 0 | 0 | 1 | 0 | |
| 1 | 1 | 0 | 1 | 0 | 1 | 0 | 0 | |
| 1 | 1 | 1 | 0 | 1 | 0 | 0 | 0 | |

FIG. 4J

Regenerated Check Bit Equations 22A new c0 = d0 XOR d1 XOR d2
new c1 = d0 XOR d1 XOR d3
new c2 = d0 XOR d2 XOR d3

Syndrome Equations 24 s0 = c0 XOR new c0
s1 = c1 XOR new c1
s2 = c2 XOR new c2

Table 50A

| error | code word 10 | | | | | | | syndrome 16 | | |
|---|---|---|---|---|---|---|---|---|---|---|
| | d0 | d1 | d2 | d3 | c0 | c1 | c2 | s0 | s1 | s2 |
| none | 0 | 0 | 0 | 0 | 0 | 0 | 0 | 0 | 0 | 0 |
| c2 | 0 | 0 | 0 | 0 | 0 | 0 | 1 | 0 | 0 | 1 |
| c1 | 0 | 0 | 0 | 0 | 0 | 1 | 0 | 0 | 1 | 0 |
| c0 | 0 | 0 | 0 | 0 | 1 | 0 | 0 | 1 | 0 | 0 |
| d3 | 0 | 0 | 0 | 1 | 0 | 0 | 0 | 0 | 1 | 1 |
| d2 | 0 | 0 | 1 | 0 | 0 | 0 | 0 | 1 | 0 | 1 |
| d1 | 0 | 1 | 0 | 0 | 0 | 0 | 0 | 1 | 1 | 0 |
| d0 | 1 | 0 | 0 | 0 | 0 | 0 | 0 | 1 | 1 | 1 |

*FIG. 6B*

Regenerated Check Bit Equations 22A new c0 = d0 XOR d1 XOR d2
new c1 = d0 XOR d1 XOR d3
new c2 = d0 XOR d2 XOR d3
new c3 = d1 XOR d2 XOR d3

Syndrome Equations 24 s0 = c0 XOR new c0
s1 = c1 XOR new c1
s2 = c2 XOR new c2
s3 = c3 XOR new c3

Table 50B

| error | Code Word 10 | | | | | | | | Syndrome 18 | | | |
|---|---|---|---|---|---|---|---|---|---|---|---|---|
| | d0 | d1 | d2 | d3 | c0 | c1 | c2 | c3 | s0 | s1 | s2 | s3 |
| none | 0 | 0 | 0 | 0 | 0 | 0 | 0 | 0 | 0 | 0 | 0 | 0 |
| c3 | 0 | 0 | 0 | 0 | 0 | 0 | 0 | 1 | 0 | 0 | 0 | 1 |
| c2 | 0 | 0 | 0 | 0 | 0 | 0 | 1 | 0 | 0 | 0 | 1 | 0 |
| c1 | 0 | 0 | 0 | 0 | 0 | 1 | 0 | 0 | 0 | 1 | 0 | 0 |
| c0 | 0 | 0 | 0 | 0 | 1 | 0 | 0 | 0 | 1 | 0 | 0 | 0 |
| d3 | 0 | 0 | 0 | 1 | 0 | 0 | 0 | 0 | 0 | 1 | 1 | 1 |
| d2 | 0 | 0 | 1 | 0 | 0 | 0 | 0 | 0 | 1 | 0 | 1 | 1 |
| d1 | 0 | 1 | 0 | 0 | 0 | 0 | 0 | 0 | 1 | 1 | 0 | 1 |
| d0 | 1 | 0 | 0 | 0 | 0 | 0 | 0 | 0 | 1 | 1 | 1 | 0 |

FIG. 6C

Table 60

| Used Syndromes | | | | Encoded Binary Value | Identified Error |
|---|---|---|---|---|---|
| 0 | 0 | 0 | 0 | 0 | None |
| 0 | 0 | 0 | 1 | 1 | c3 |
| 0 | 0 | 1 | 0 | 2 | c2 |
| 0 | 1 | 0 | 0 | 4 | c1 |
| 1 | 0 | 0 | 0 | 8 | c0 |
| 0 | 1 | 1 | 1 | 7 | d3 |
| 1 | 0 | 1 | 1 | 11 | d2 |
| 1 | 1 | 0 | 1 | 13 | d1 |
| 1 | 1 | 1 | 0 | 14 | d0 |

Table 70

| Unused Syndromes | | | | Encoded Binary Value |
|---|---|---|---|---|
| 0 | 0 | 1 | 1 | 3 |
| 0 | 1 | 0 | 1 | 5 |
| 0 | 1 | 1 | 0 | 6 |
| 1 | 0 | 0 | 1 | 9 |
| 1 | 0 | 1 | 0 | 10 |
| 1 | 1 | 0 | 0 | 12 |
| 1 | 1 | 1 | 1 | 15 |

*FIG. 8B*

SYSTEM AND METHOD FOR VERIFYING ERROR DETECTION/CORRECTION LOGIC

BACKGROUND OF THE INVENTION

1. Field of the Invention

This invention relates to error detecting systems, and more particularly, to testing error detection/correction logic.

2. Description of the Related Art

Error codes are commonly used in electronic systems to detect and correct data errors, such as transmission errors or storage errors. For example, error codes may be used to detect and correct errors in data transmitted via a telephone line, a radio transmitter, or a compact disc laser. Error codes may additionally be used to detect and correct errors associated with data stored in the memory or mass storage devices of computer systems. One common use of error codes is to detect and correct errors of data transmitted on a data bus of a computer system. In such systems, error correction bits, or check bits, may be generated for the data prior to its transfer or storage. The check bits may then be transmitted or stored with the data. When the data is received or retrieved, the check bits may be used to detect and/or correct errors within the data.

Errors in transmitted or stored data may be caused by transient conditions in a system. For example, some errors may be caused by cross talk or noise. Component failures are another common source of error in electrical systems. Faulty components may include faulty memory chips or faulty data paths provided between devices of a system. For example, faulty data paths may result from faulty pins, faulty data traces, or faulty wires.

Hamming codes are one example of commonly used error codes. The check bits in a Hamming code may be parity bits for portions of the data bits. Each check bit may provide the parity for a unique subset of the data bits. If an error occurs (i.e., one or more of the data bits unintentionally change state), one or more of the check bits will also change state upon regeneration (assuming the error is within the class of errors covered by the code). By determining which of the regenerated check bits changed state, the location of the error within the data may be determined. For example, if one data bit changes state, this data bit will cause one or more of the regenerated check bits to change state. Based on which of the check bits change state, the erroneous bit may be identified and the error may be corrected by inverting the erroneous bit.

One common use of Hamming codes is to correct single bit errors within a group of data. Generally, the number of check bits must be large enough such that $2^k-1$ is greater than or equal to n+k, where k is the number of check bits and n is the number of data bits. Accordingly, seven check bits are typically required to implement a single error correcting Hamming code for 64 data bits. A single error correcting (SEC) Hamming code is capable of detecting and correcting a single-bit error.

Hamming codes that are capable of detecting double-bit errors may also be designed. Typically, such a Hamming code generates the same check bits as a single-error correction code as well as an additional check bit that provides the double-error detection. Such a code is known as a single-error correcting, double-error detecting (SECDED)) code.

There are also other error codes that, like Hamming codes, provide error detection and/or correction by generating check bits. For example, Golay codes may be used to provide multiple levels of error detection and correction.

The error detection/correction logic used to encode or decode data according to a particular error code may itself be susceptible to failure or errors. Since the error protection provided by such a device may depend on the device functioning properly, it is desirable to be able to test error detection/correction logic. However, tests for error detection/correction logic tend to input a large number of test values into the logic being tested, and as a result, the verification may take a significant amount of time to perform. Furthermore, even though large numbers of test values may be used, these test values may not be selected to thoroughly test each component of the error detection/correction logic, and thus the tests may not provide a complete verification of the device being tested.

SUMMARY

Various embodiments of methods and systems for testing error correction/detection logic such as a Hamming code encoder/decoder are disclosed. In one embodiment, a method of testing may involve providing each of a set of n data bit combinations to the error detection/correction logic. Each data bit combination has n bits, and each possible value of each data bit is present in at least one of the n data bit combinations. In response to being provided with the test data bit combinations, the error detection/correction logic generates a set of check bits for each of the n data bit combinations. The set of check bits generated by the error detection/correction logic for each of the n data bit combinations may then be verified.

In one embodiment, an initial data bit combination may be created where each data bit in the initial data bit combination has the same logical value as each other data bit in the initial data bit combination. A bit having a different logical value may be shifted across the initial data bit combination. Each time the bit is shifted, one of the n data bit combinations provided to the error detection/correction logic may be created.

Testing error detection/correction logic may also involve providing a set of m+1 m-bit test code words to the error detection/correction logic. One of the code words in the set may be a correct code word, and each other test code word in the set may have a single-bit error. Each of the test code words that has a single-bit error may have the error at a different bit position than the others. In response to receiving each of the test code words, the error detection/correction logic may decode the code word and the error detection/correction logic's output may be verified.

In one embodiment, each bit in the correct test code word may have the same logical value, and each of the test code words that has a single-bit error may include a bit having the opposite logical value. The erroneous test code words may be created by shifting the bit having the opposite logical value across the correct test code word.

If the error detection/correction logic is configured to detect double-bit errors, testing may also involve providing a set of test code words to the error detection/correction logic. An error may be introduced into each of the test code words in the set by substituting check bits corresponding to an unused syndrome for a correct set of check bits within each test code word. Each test code word may include substituted check bits that correspond to a different unused syndrome than those in the other test code words. In response to being provided with the test code words, the error detection/correction logic may decode the test code words and its output may be verified by determining whether it correctly detected the error in each of the test code words.

In another embodiment, a tester for testing error detection/correction logic includes check bit generator testing means for creating a set of test data bit combinations and providing these test data bit combinations to a check bit generator within the error detection/correction logic. The set of test data bit combinations contains n n-bit data bit combinations. Each data bit has each possible logical value in at least one of the n data bit combinations. Comparison means for comparing the check bits output by the error detection/correction logic to known correct check bits for each of the n data bit combinations may also be included. The check bit generating means and the comparison means may be implemented in hardware (e.g., as shown in FIG. 4A) or in software (e.g., that operates as shown and discussed in FIGS. 3 and 5).

The testing means may also include test code word generating means for creating a set of test code words and providing these test code words to error detection/correction logic. The set of test code words may include m+1 m-bit test code words. One of the test code words may be correct, and the other test code words in the set may each include a single-bit error at a particular bit position. Each erroneous test code word may have an error at a different bit position than the others. The comparison means may compare the error detection/correction logic's output for each of the test code words to a set of known correct output to verify that the decoder correctly detected and/or corrected each single-bit error present in the set of test code words.

The testing means may also include another embodiment of test code word generating means for creating a set of test code words and providing these test code words to a decoder. The correct check bits in each test code word may have been replaced with check bits corresponding to an unused syndrome. The comparison means may be configured to compare the decoder's output for each test code word with a known correct output to verify whether the decoder indicates that a double-bit error was detected for each of the test code words.

In one embodiment, a computer readable medium includes program instructions computer executable to provide each of a set of n data bit combinations to error detection/correction logic such as a Hamming code encoder/decoder. Each data bit combination has n bits, and each possible value of each data bit is present in at least one of the n data bit combinations. The program instructions are also computer executable to compare a set of check bits generated by the error detection/correction logic for each of the n data bit combinations to a set of known correct check bits.

BRIEF DESCRIPTION OF THE DRAWINGS

FIGS. 4A–4E show block diagrams and tables illustrating the operation of one embodiment of a Hamming code encoder.

FIGS. 4F–4J show block diagrams and tables illustrating the operation of another embodiment of a Hamming code encoder.

FIGS. 6A–6C show a block diagram and tables illustrating various embodiments of a Hamming code decoder.

FIGS. 8A–8B show a block diagram and tables illustrating one embodiment of a SECDED Hamming code decoder.

Figure 1:
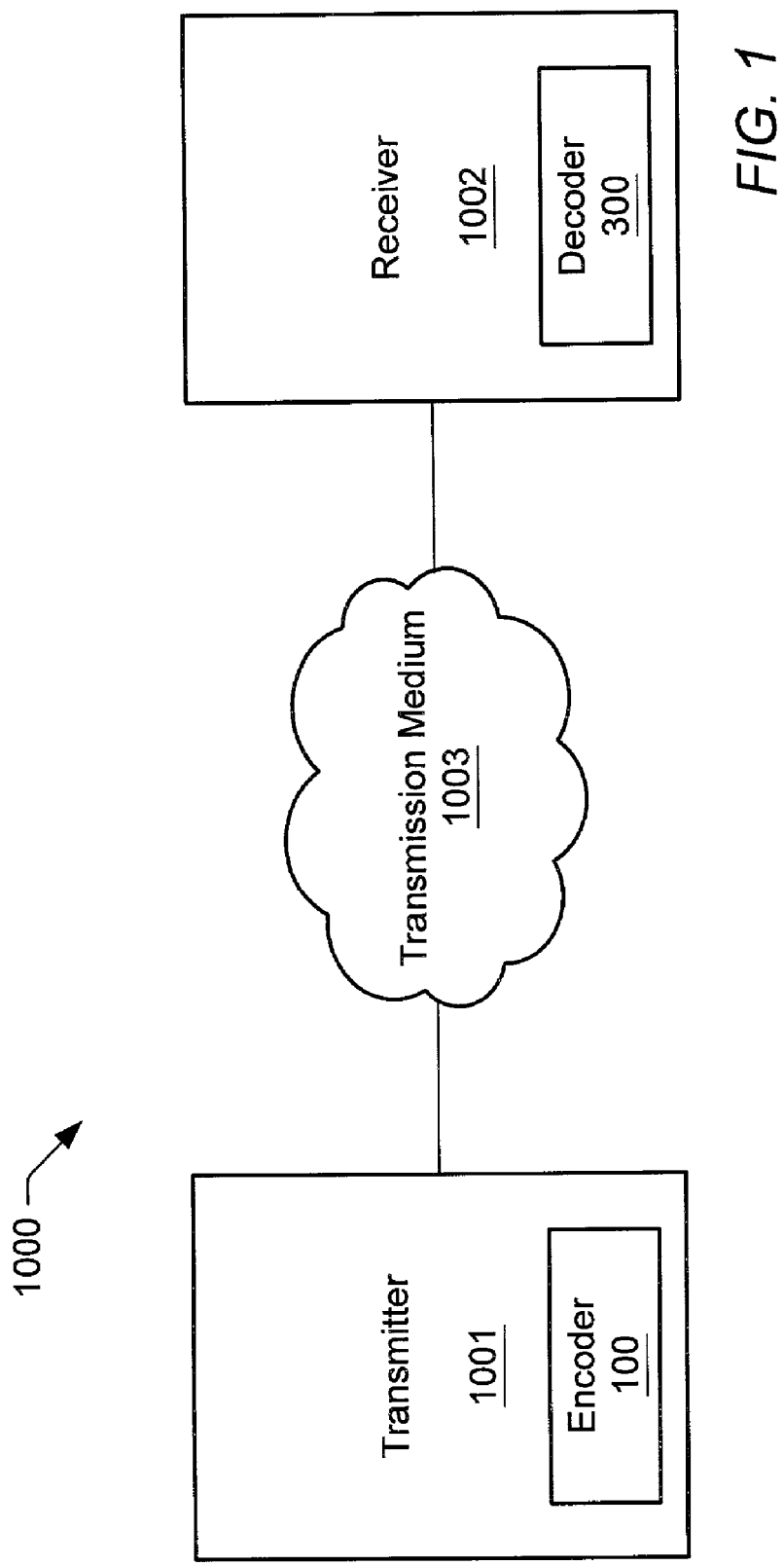
FIG. 1 shows one embodiment of a communication system that includes error detection/correction logic such as a Hamming code encoder/decoder and means for testing the error detection/correction logic.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF EMBODIMENTS

Before describing various embodiments of a method and system for testing error detection/correction logic, several exemplary systems that may include error detection/correction logic and an embodiment of a tester for such error detection/correction logic will be described.

FIG. 1 shows one embodiment of a communication system 1000 that may include an error code encoder 100 and an error code decoder 300. Communication system 1000 may include a transmitter 1001 and a receiver 1002. Transmitter 1001 may be configured to encode data into a code word using encoder 100. The code word may be transmitted to receiver 1002 via transmission medium 1003. Receiver 1002 may receive the transmitted code word. Using decoder 300, receiver 1002 may extract the original data bits sent by transmitter 1001 and detect whether any errors occurred during transmission. If a single-bit error occurred in a data bit, decoder 300 may correct the erroneous bit. If the error code being used is a SECDED code or a code that provides even higher levels of error detection/correction, decoder 300 may also detect whether any multi-bit errors occurred during transmission of the code word. The transmitter 1001 and receiver 1002 shown in FIG. 1 may each also include a tester to test encoder 100 and decoder 300. The testers may operate as described below with reference to FIGS. 3–10.

Figure 2:
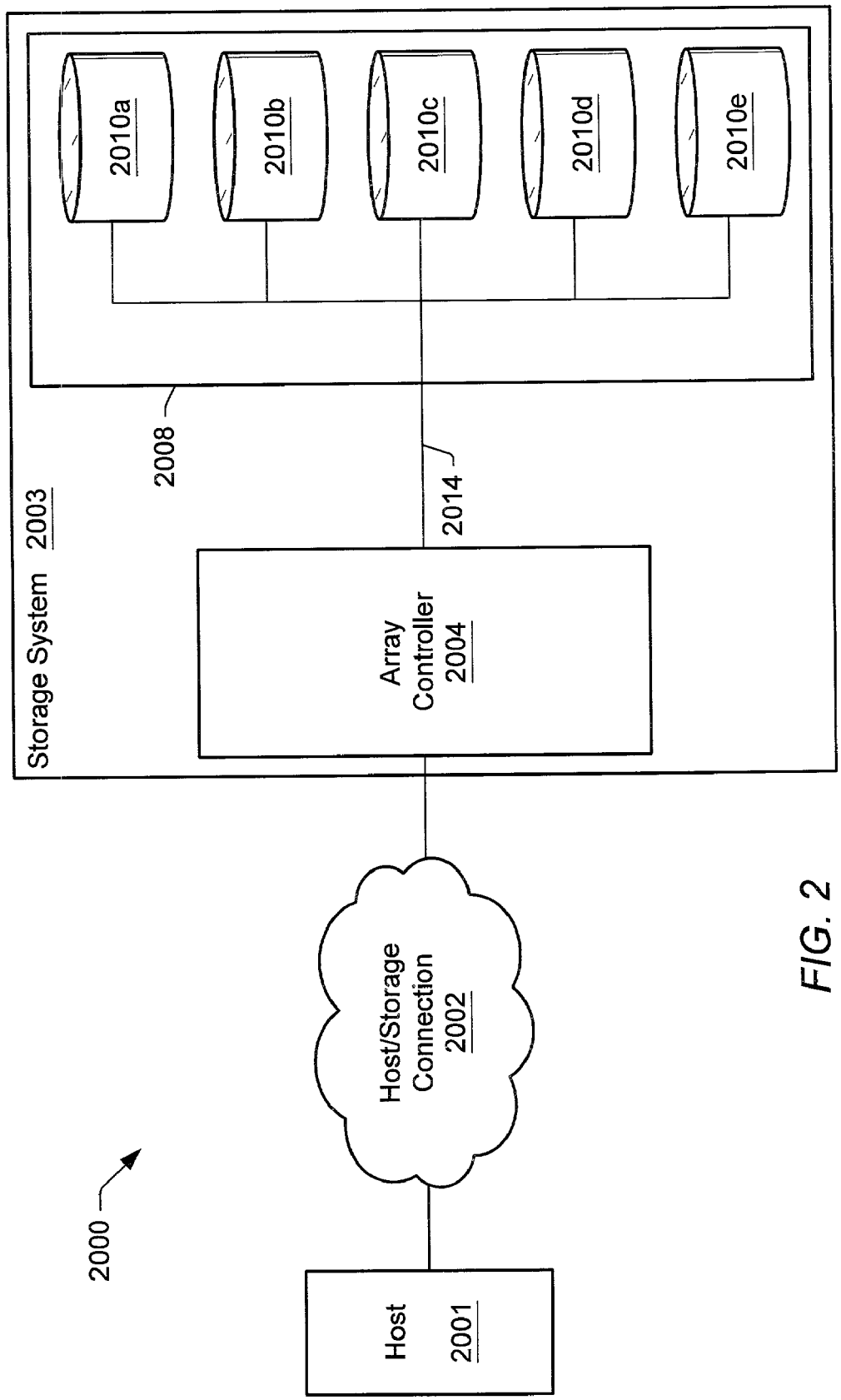
FIG. 2 illustrates one embodiment of a data processing system that includes error detection/correction logic and means for testing the error detection/correction logic.

FIG. 2 shows another embodiment of a system 2000 that may include one or more error code encoders/decoders. FIG. 2 shows a functional block diagram of a data processing system 2000, which includes a host 2001 connected to a storage system 2003 via host/storage connection 2002. Host/storage connection 2002 may be, for example, a local bus, a network connection, an interconnect fabric, or a communication channel. Storage system 2003 may be a RAID storage subsystem or other type of storage array. In various embodiments, a plurality of hosts 2001 may be in communication with storage system 2003 via host/storage connection 2002.

Contained within storage system 2003 is a storage device array 2008 that includes a plurality of storage devices 2010a–2010e (collectively referred to as storage devices 2010). Storage devices 2010a–2010e may be, for example, magnetic hard disk drives, optical drives, magneto-optical drives, tape drives, solid state storage, or other non-volatile memory. As shown in FIG. 2, storage devices 2010 are disk drives and storage device array 2003 is a disk drive array. Although FIG. 2 shows a storage device array 2003 having five storage devices 2010a–2010e, it is understood that the number of storage devices 2010 in storage device array 2003 may vary and is not limiting.

Storage system 2003 also includes an array controller 2004 connected to each storage device 2010 in storage array 2008 via one or more data paths 2014. Data path(s) 2014 may provide communication between array controller 2004 and storage devices 2010 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 2004 may take many forms, depending on the design of storage system 2003. In some systems, array controller 2004 may only provide simple I/O connectivity between host 2001 and storage devices 2010 and the array management may be performed by host 2001. In other embodiments of storage system 2003, such as controller-based RAID systems, array controller 2004 may also include a volume manger to provide volume management, data redundancy, and file management services. In other embodiments of the present invention, the volume manager may reside elsewhere in data processing system 2000. For example, in software RAID systems, the volume manager may reside on host 2001 and be implemented in software. In other embodiments, the volume manager may be implemented in firmware that resides in a dedicated controller card on host 2001. In some embodiments, array controller 2004 may be connected to one or more of the storage devices 2010. In yet other embodiments, a plurality of array controllers 2010 may be provided in storage system 2003 to provide for redundancy and/or performance improvements.

Various components of data processing system 2000 may include error correction/detection logic such as Hamming code encoders and/or decoders. For example, in one embodiment, host 2001 may include error detection/correction logic to provide protection against errors that may occur as data is sent over connection(s) 2002 and stored within storage system 2003. Host 2001 may include such error detection/correction logic on a dedicated controller card in one embodiment. Array controller 2004 may also include error correction/detection logic in some embodiments. Similarly, in one embodiment, each individual storage device 2010a–2010e may also include some form of error detection/correction logic. In addition, one or more testers for the error detection/correction logic may be included in data processing system 2000. These testers may be configured as described below with respect to FIGS. 3–10.

Figure 3:
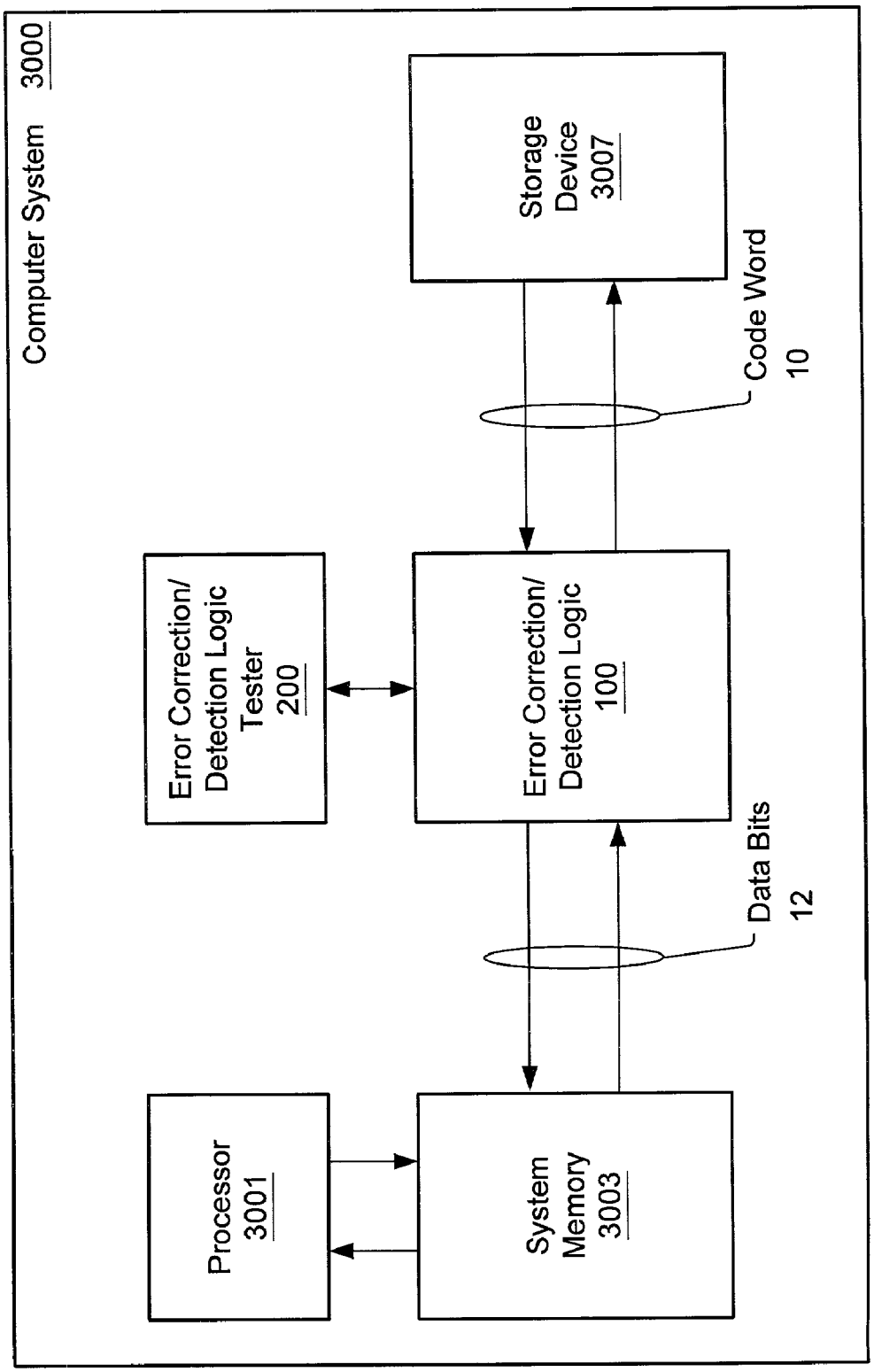
FIG. 3 is a block diagram of one embodiment of a computer system.

FIG. 3 shows a diagram representing data flow in one embodiment of a computer system 3000 that may include error correction/detection logic 100. In this particular embodiment, error correction/detection logic 100 includes a Hamming encoder/decoder. Computer system 3000 may include a processor 3001 configured to operate on data and instructions stored in system memory 3003. System memory 3003 may include random access memory (RAM) such as DRAM, SDRAM, DDR DRAM, RDRAM, etc. Data may be written from system memory 3003 to a storage device 3007 (e.g., a disk drive or a storage system like that shown in FIG. 2, etc.). Encoder/decoder 100 may include a check bit generator that may be used to generate check bits used for both encoding and decoding data as it is respectively written to and read from storage device 3007. In one embodiment, encoder/decoder 100 may be included on a dedicated card coupled to a peripheral bus in computer system 3000. It is noted that the arrows in FIG. 3 show data flow and that the actual physical interconnections between the elements in FIG. 3 may be significantly more complex in many embodiments.

Generally, data bits 12 from system memory 3003 may be encoded into a code word 10 that includes the check bits that are generated by the check bit generator as the data is written to the storage device 3007. The resulting code word 10 may be stored in the storage device 3007. When the data bits are requested from the storage device 3007 (e.g., as part of a read operation), the code word 10 containing the data bits may be received and decoded. The code word 10 may be checked for transmission or storage errors by the encoder/decoder 100 by generating a new set of check bits in the check bit generator and comparing the new check bits with the check bits that are included in code word 10. Based on the output of this comparison, the decoder may indicate whether the data bits are correct and/or perform error correction.

In some embodiments, computer system 3000 may include a software tester designed to test encoder/decoder 100. Test instructions designed to test encoder/decoder 100 may be executed by processor 3001 and stored in system memory 3003. In one embodiment, the test software may be configured to be executed when computer system 3000 boots up. In some embodiments, the test instructions may be stored on another computer readable medium (e.g., a CD, DVD, hard disk, optical disk, tape device, floppy disk, etc.). In order to execute the instructions, the instructions may be loaded into system memory 3003. In addition, the computer readable medium may be located in either a first computer, in which the software program is stored or executed, or in a second different computer, which connects to the first computer over a network such as the Internet. In the latter instance, the second computer may provide the program instructions to the first computer for execution. The instructions and/or data used to test the encoder/decoder may also be transferred upon a carrier medium. In some embodiments, a computer readable medium may be a carrier medium such as networks and/or a wireless link upon which signals such as electrical, electromagnetic, or digital signals may be conveyed.

In an alternative embodiment, encoder/decoder 100 may include a hardware tester 200 configured to generate test data, input the test data to the encoder/decoder, and verify the resulting output from various components of the encoder/decoder in response to the test data. In some embodiments, the tester 200 may be configured to perform the test each time power is supplied to the encoder/decoder 100.

Figure 4A:
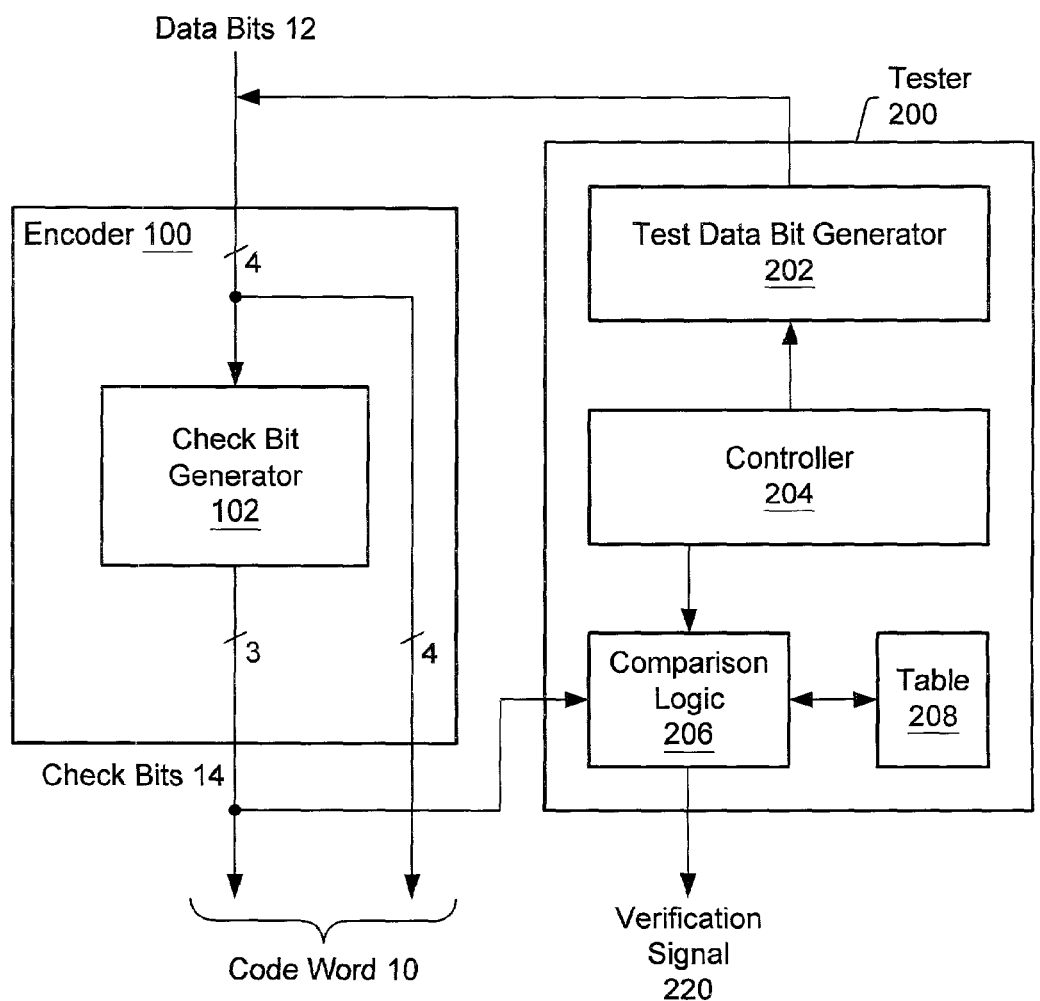

FIG. 4A shows a typical single error detecting and correcting (SEC) Hamming code encoder 100. Encoder 100 may be used in a system that is transmitting or storing data bits 12. For example, encoder 100 may be included in a computer configured to control a storage device or storage array. As data is written to the storage device, it may be encoded by encoder 100. Similarly, a transmitter in a communication system may include an encoder 100 to encode data being transmitted to a receiver.

In the illustrated example, encoder 100 receives data bits 12 and generates a code word 10. Code word 10 includes data bits 12 and check bits 14. For simplicity, this example shows a system that generates a 7-bit code word 10 from four data bits 12 and three check bits 14. It is noted that in many embodiments, significantly larger numbers of data bits may be input (e.g., in one embodiment, there may be 64 data bits), and correspondingly larger code words (e.g., in one embodiment, 72-bit code words) may be generated using similar techniques. Generally, the data bits 12 and check bits 14 may be arranged in any desired order to form code word 10.

Figure 4B:
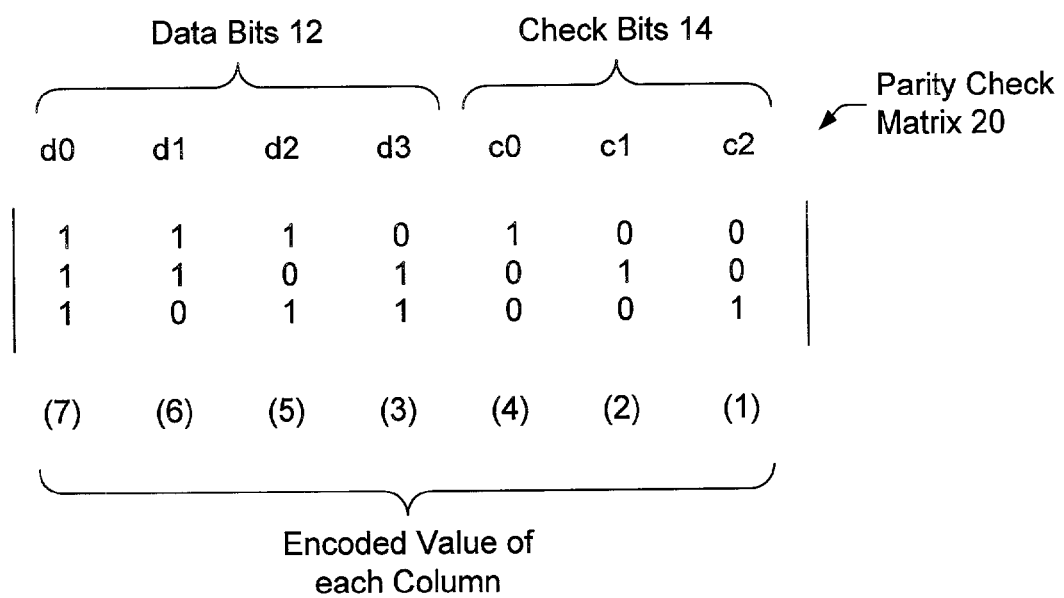

Check bit generator 102 generates check bits 14 from data bits 12. FIG. 4B shows an example of a parity check matrix 20 that may correspond to the encoding used by one embodiment of check bit generator 100. FIG. 4B also shows the check bit equations 22 corresponding to the parity check matrix 20. As labeled, each column in parity check matrix 20 may correspond to a data bit or a check bit. The check bit equations 22 correspond to each row of the parity check matrix. For example, check bit c0 may be defined to equal d0 XOR d1 XOR d2 based on the pattern of ones and zeros in the first row of matrix 20 (each data bit whose column has a one in the first row is included in the equation for c0). Since each column is unique and non-zero, each check bit 14 depends on a unique subset of the data bits 12.

The encoded value of each column (looking from the topmost row to the bottommost row) is also labeled. Note that values 1, 2, and 4 are the encoded values of the check bit columns (which correspond to the columns in an identity matrix, causing each check bit to depend on a different set of data bits 12 than the other check bits). The remaining values, 3, 5, 6, and 7, may be encoded to create the data bit columns. The columns may be restricted to those that are non-zero so that each data bit contributes to at least one check bit equation.

For simplicity, columns are identified by their encoded value throughout this disclosure. In this example, the data bit columns are arranged in the order 7-6-5-3. However, the columns for the data bits may be arranged in any order. For example, in other embodiments, the data bit columns may be arranged in the order 3-5-6-7 (or 6-3-5-7, or 7-3-5-6, and so on). Thus, many different parity check matrixes 20 and check bit equations 22 may be selected to implement encoder 100.

While this example shows a (7,4) Hamming code (i.e., one that produces a 7-bit code word from four data bits), the principles described above may be applied to any size of Hamming code. Additionally, similar principles may apply to other error codes such as Golay codes. Furthermore, while the above example shows the check bits being generated by XORing unique combinations of the data bits, other embodiments may generate check bits using other operations.

Based on the specific example shown in FIG. 4B, FIG. 4C illustrates a table 30 of the check bits 14 that may be generated for each combination of data bits 12 input to encoder 100. Note that the values in table 30 depend on the arrangement of the data bit columns in parity check matrix 20, and thus these values may vary between different embodiments.

Returning to FIG. 4A, tester 200 is shown. In some embodiments, tester 200 may be configured in hardware. Alternatively, all or some of tester 200's functionality may be implemented in software. As illustrated, tester 200 may include a controller 204 configured to control test data bit generator 202 and comparison logic 206. Test data bit generator 202 may be configured to generate test data bits and input the test data bits to test check bit generator 102. Exemplary sets of test data bits that may be generated by test data bit generator 202 are discussed with respect to FIGS. 4D and 4E. Comparison logic 206 may be configured to receive the check bits 14 generated by check bit generator 102 for each set of test data bits. Comparison logic 206 may also be configured to compare the check bits 14 generated by check bit generator 102 with a set of check bits that are known to be correct for that particular set of test data bits. The known correct check bits may be stored in a table 208. In response to performing the comparison, the comparison logic 206 may output a verification signal 220 indicating whether the check bit generator 102's output is correct.

One way to test a check bit generator might be to generate each possible combination of data bits and to check whether the check bit generator 102 output the correct set of check bits for each input set of data bits. However, as table 30 shows, the number of test values required for such a test is $2^n$, where n is the number of data bits 12. For large values of n, the number of tests required may become undesirably large and/or time consuming. Similarly, a random subset of the total $2^n$ combinations could be used as the test values, but this set might not test the encoder 100 thoroughly.

In one embodiment, a check bit generator may be tested by using a subset of all of the potential data bit combinations as the set of test data. FIG. 4D illustrates a table 40A of one such subset of the data bit combinations. The subset of data bit combinations shown in table 40A may be selected so that each data bit d0–d3 has a value of '0' in at least one combination and a value of '1' in at least one combination. This way, the check bit generator is tested using both possible values ('0' and '1') of each data bit. As shown by table 30, for the illustrated selection of input values, the check bit generator 102 should generate each value ('0' or '1') of each check bit 14 at least once, also. Selecting the subset of data bit combinations may thoroughly test the functionality of the check bit generator 102. For example, in some embodiments of check bit generator 102, choosing the subset of data bit combinations so that each data bit assumes each possible value at least once and so that each possible value of each check bit is generated at least once may test logic within check bit generator 102 for stuck-at-0 and stuck-at-1 faults.

FIG. 4E shows another subset of data bit combinations that may be used as test data. In FIG. 4E, the data bit combinations have again been selected so that each data bit d0–d3 has a value of '0' in at least one combination and a value of '1' in at least one combination. Similarly, each check bit c0–c2 should be generated as a '0' at least once and a '1' at least once when the illustrated data bit combinations are input to the check bit generator 102 if check bit generator 102 is operating properly. As FIGS. 4D and 4E shows, a test set of n data bit combinations, where n is the number of data bits in each combination, may be used to test check bit generation.

While other subsets of the data bit combinations may be selected, it may be desirable to select one of the illustrated subsets from FIGS. 4D and 4E. The subsets shown in FIGS. 1D and 1E may be created by setting a set of initial data bits to all zeros or all ones and then "walking" or shifting a 1 or a 0 across each data bit position d0–d3. After each step or shift, a different one of the data bit combinations is generated. In some embodiments, this may simplify the creation of the set of test data.

In some embodiments, the same check bit generator may be used in both the encoder and the decoder portions of an encoder/decoder 100 (like the one shown in FIG. 3), allowing the check bit generator's output to be tested during either encoding or decoding (e.g., in a storage system, the check bit generator may be tested during either reads or writes). For example, looking at FIG. 3, test software may create a set of data bit combinations and write each combination to the storage device 3007, verifying that the check bits generated on each write (or on a subsequent read) are correct. In one embodiment, the tester may reuse the same storage location on storage device 3007 each time test data is written to and/or read from the storage device 3007. In some embodiments, test software stored in system memory 3003 and executing in processor 3001 may contain program instructions configured to test the check bit generator in encoder/decoder 100 by writing data to the storage device 3007, manipulating the data that was written to the storage device 3007 in order to create the various data bit combinations being used as the test inputs, reading back the data bit combinations, and verifying that the check bits generated on each read are correct. The encoder/decoder 100 may be configured so that the check bits generated for reads and/or writes are available to be read by the test software. In some embodiments, the test software may disable error correction (e.g., by clearing or setting a bit in a control register associated with the error detection/correction logic being tested) while testing the check bit generator.

FIGS. 4F–4J illustrate another embodiment of an encoder 100A. In this embodiment, the check bit generator 102A in the encoder 100A is configured to generate check bits 14 from data bits 12 in accordance with a SECDED Hamming code. In the embodiment of encoder 100A illustrated in FIG. 4F, the check bit generator 102A is configured to receive four data bits 12 and, in response, to generate four check bits 14. A tester (not shown) similar to tester 200 shown in FIG. 4A may be used to test encoder 100A.

FIG. 4G shows an example of the parity matrix that may define the check bit equations 22A that the check bit generator 102A uses to generate check bits 14. This parity check matrix is similar to that shown in FIG. 4B, but an additional column and row has been added in order to define the fourth check bit c3. As in FIG. 4B, there are many different parity check matrixes that may be selected. For example, in this embodiment, the check bit columns have encoded values 1, 2, 4, and 8. Accordingly, any of the columns having encoded values of 3, 5, 6, 7, 9, 10, 11, 12, 13, 14, or 15 may be used as the data bit columns of the matrix, and the data bit columns may be arranged in any order. However, since there are only four data bits in this embodiment, some of the possible data bit columns will go unused. Thus, in this example, columns 14, 13, 11, and 7 have been selected as the data bit columns, leaving columns 3, 5, 6, 9, 10, 12, and 15 unused. Similar parity check matrixes may be generated for larger or smaller sets of data bits 12.

FIG. 4H illustrates a table 30A of the check bits 14 that may be generated for different sets of data bits 12 using the check bit equations 22A shown in FIG. 4G. FIGS. 4I and 4J show possible sets of data bit combinations that may be used to test encoder 100A's check bit generator 102A. These subsets of the possible data bit combinations shown in FIG. 4H may be used to test encoder 100A using as few as n tests, where n is the number of data bits in each data bit combination. As in FIGS. 4D and 4E, the data bit combinations used as test inputs may be selected so that each data bit is equal to 0 in at least one of the combinations and equal to 1 in at least one of the combinations.

Additionally, the test inputs may be selected so that each check bit should be generated as 0 and as 1 at least once in response to the test set of data bit combinations.

Figure 4F:
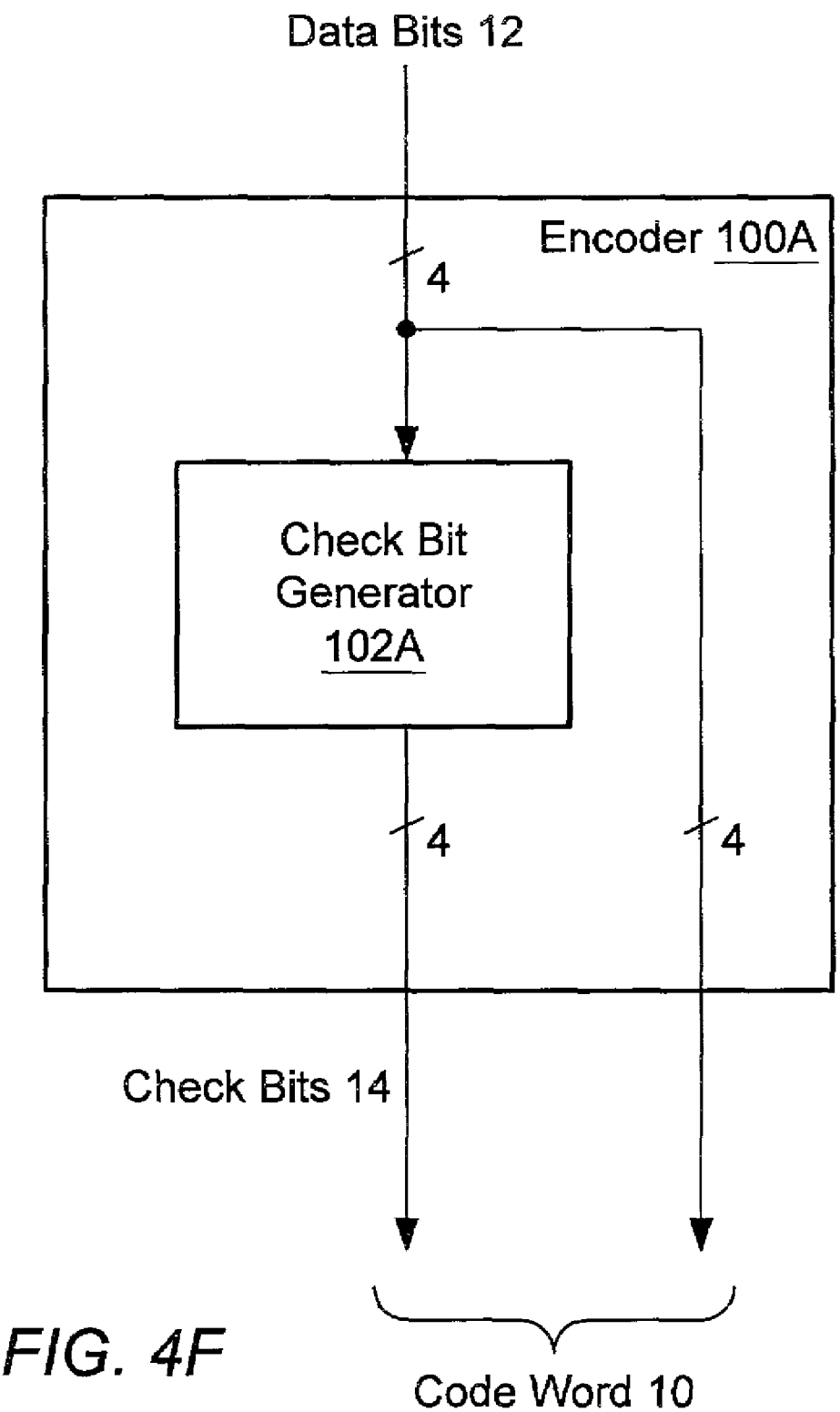
Figure 5:
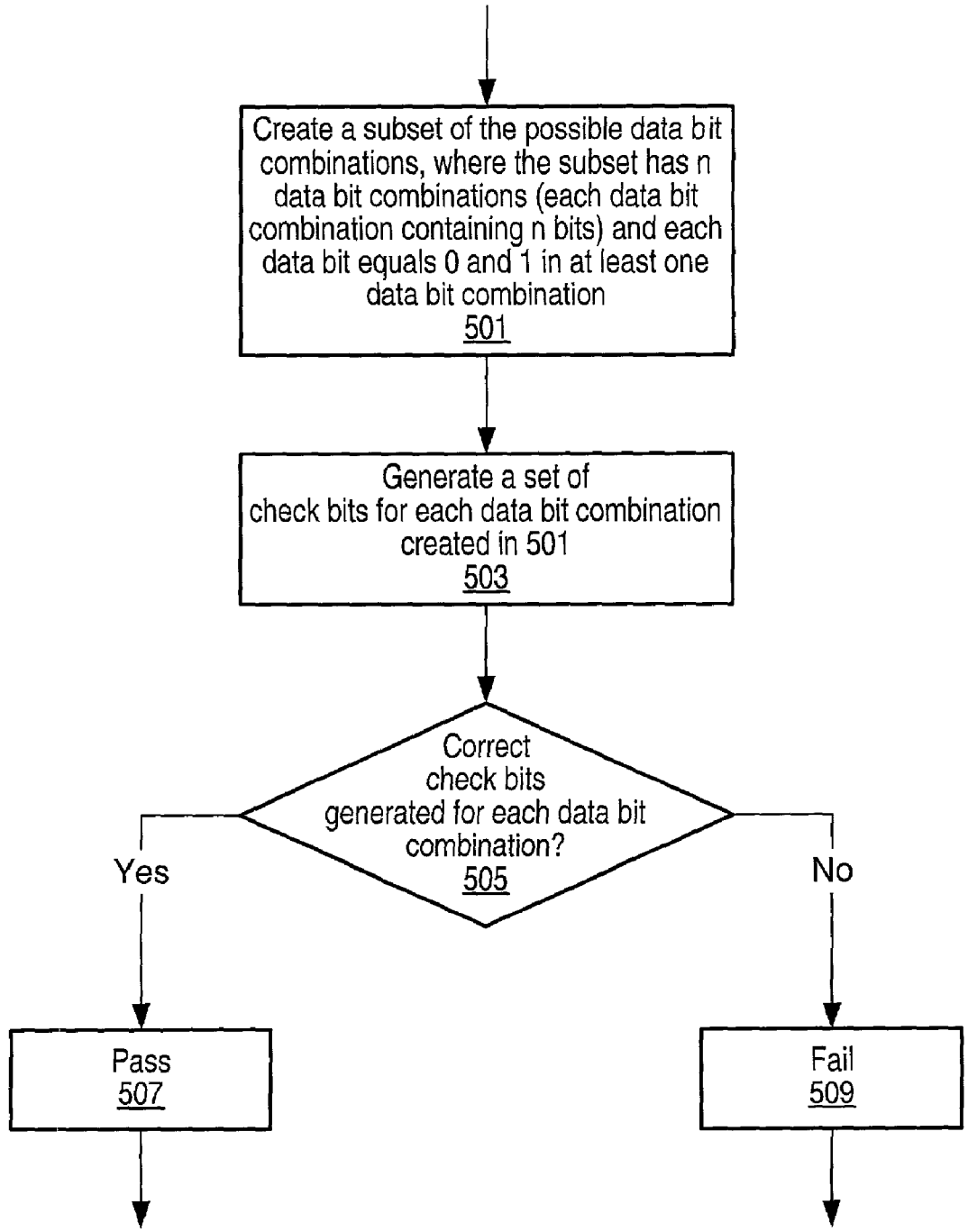
FIG. 5 is a flowchart of one embodiment of a method of testing a check bit generator within error detection/correction logic.

FIG. 5 shows one embodiment of a method of testing a check bit generator like the ones shown in FIGS. 4A and 4F. In step 501, each data bit combination in a subset of the possible data bit combinations is presented to the check bit generator. The subset contains fewer than all of the possible data bit combinations, and the data bit combinations within the subset are selected so that each data bit equals 0 and 1 in at least one combination in the subset. The data bit combinations may also be selected so that, if the check bit generator is working properly, the check bit generator will output each possible check bit value (0 and 1) for each check bit at least once in response to receiving the data bit combinations in the subset.

In some embodiments, the subset of data bit combinations used to test the check bit generator may be generated (e.g., by test data bit generator 202 in FIG. 4A) by creating an initial data bit combination in which all of the data bits equal the same data bit value (e.g., 0 or 1) and then "walking" or shifting the opposite data bit value (e.g., 1 or 0) across each data bit position. Each time the opposite data bit value is "walked" or shifted to a new bit position, a new data bit combination may be generated. Thus, if there are n data bits, the opposite data bit value may be shifted n times (starting with the time the opposite data bit value is shifted or walked into the first (or last) bit position in the initial data bit combination) to generate n different data bit combinations. These n data bit combinations may then be provided as test inputs to test the check bit generator.

In response to receiving each data bit combination in the subset, the check bit generator outputs a set of check bits for that data bit combination, as shown at 503. In one embodiment, test software may read the generated check bits directly from a storage device to which the code word was written after passing through the encoder. In another embodiment, the check bits may be received by a hardware tester, as shown in FIG. 4A. The check bits generated by the check bit generator may be compared to a set of check bits that are known to be correct for a particular test input. In one embodiment, a tester may maintain a verification table containing the correct check bits that should be output for each test data bit combination used to test the check bit generator. Each set of check bits generated by the check bit generator may be compared to the corresponding set of known correct check bits in the verification table. If the check bits generated at 503 are correct for each data bit combination presented in step 501, the check bit generator passes the test, as shown at 505–507. If the check bits generated in step 503 are not correct for at least one of the data bit combinations in the subset, the check bit generator fails the test, as shown at 505–509. By using the subset of data bit combinations, the check bit generator may be thoroughly tested using a relatively small set of test inputs. In some embodiments, if there are n data bits in each data bit combination, there may be n data bit combinations in the subset of data bit combinations used as test inputs.

Figure 6A:
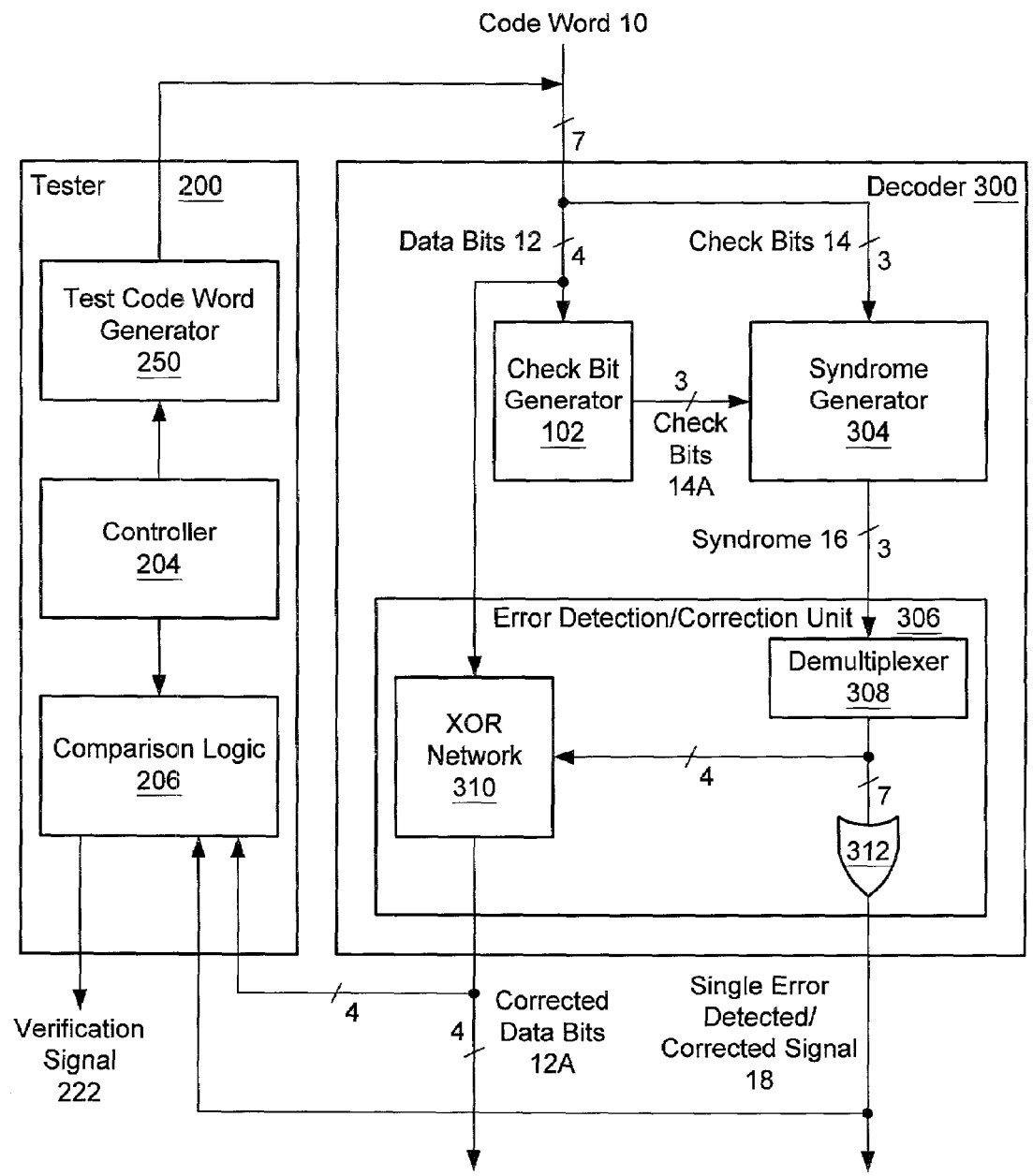

FIG. 6A shows one embodiment of a decoder 300. Decoder 300 includes a check bit generator 102 (which may be the same check bit generator 102 that is used to generate check bits when data is encoded), a syndrome generator 304, and an error detection/correction unit 306. When a code word 10 is decoded, check bit generator 102 is used to generate a new set of check bits 14A from the data bits 12.

These new check bits 14A and check bits 14 from code word 10 are presented to syndrome generator 304.

Based on the values of the original check bits 14 and the new check bits 14A, syndrome generator 304 produces a syndrome 16. If the original check bits 14 equal the new check bits 14A, syndrome generator 304 outputs a syndrome indicating that no errors were detected in the code word. Syndromes may be generated by XORing each original check bit with its corresponding new check bit, as shown by the equations 24 in FIG. 6B. Since X XOR X=0, the bits in the syndrome will all be zero if check bits 14 equal new check bits 14A. Accordingly, the zero syndrome indicates that no errors have been detected. If an error is detected in a code word (based on the values of check bits 14 and new check bits 14A), syndrome generator 304 may output a syndrome identifying the location of the detected error.

Figure 7:
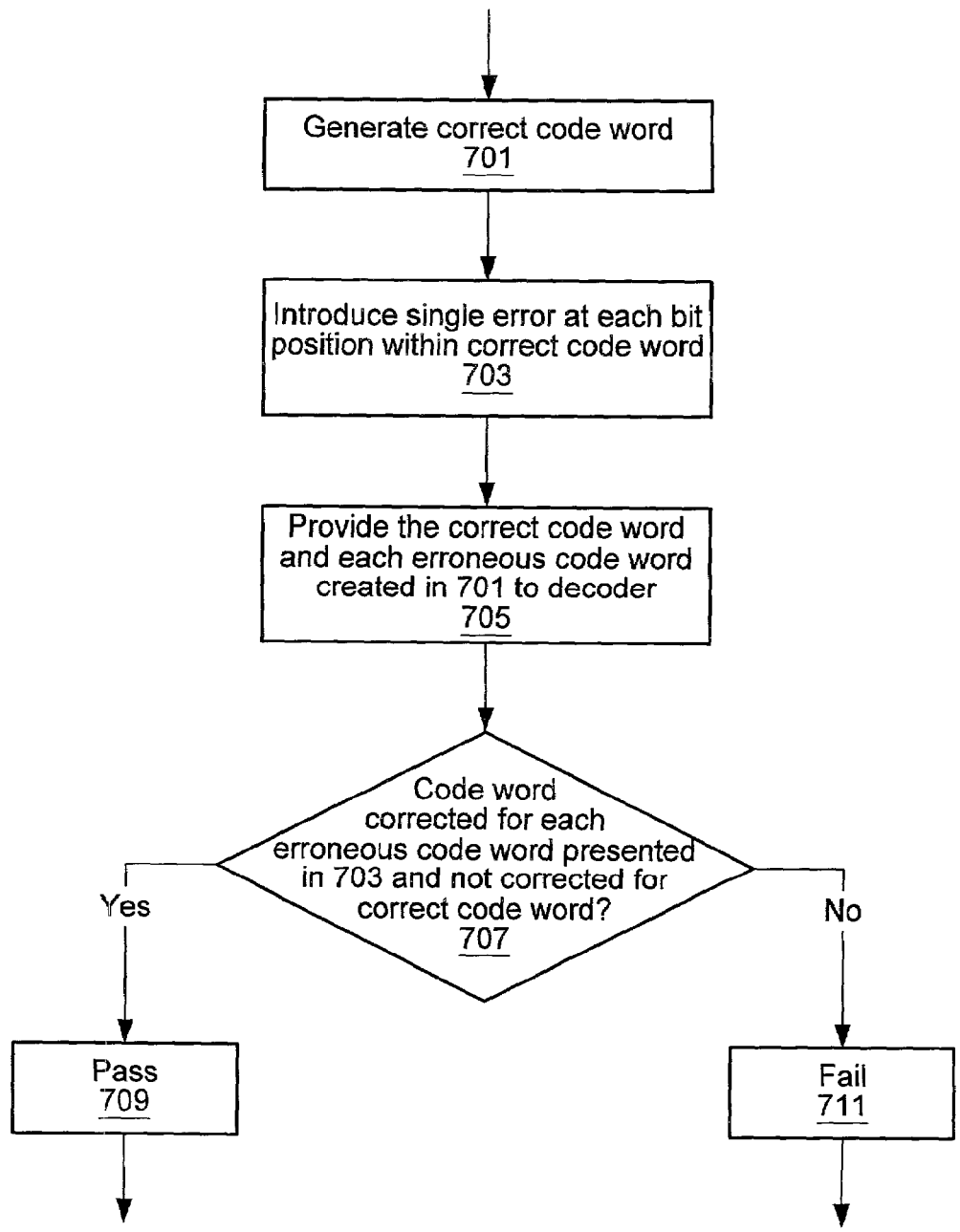
FIG. 7 is a flowchart illustrating one embodiment of a method of testing error detection/correction logic.

FIG. 6A also shows an embodiment of a tester 200 that may be used to test the operation of the decoder 300. Tester 200 may be a hardware tester in some embodiments. In other embodiments, all or part of tester 200's functionality may be implemented in software. Tester 200 may include a controller 204 configured to control comparison logic 206 and test code word generator 250. Test code word generator 250 may be configured to generate test code words and to provide those test code words to decoder 300. Exemplary sets of test code words that may be generated are illustrated in and discussed with reference to FIGS. 6C and 6D. Comparison logic 206 may be configured to receive the corrected data bits output from decoder 300 in response to each test code word and to compare those corrected data bits to a set of known correct data bits for that test code word. Comparison logic 206 may also receive the single error corrected/detected signal 18 and compare that signal to a known correct signal for each test code word. Based on the result of the comparison(s), comparison logic 206 may output a verification signal 222 indicating whether the decoder 300's output is correct. FIG. 7 describes the operation of a tester 200 according to one embodiment.

Returning to the decoder 300, Table 50A of FIG. 6B shows the syndromes that may be generated for various versions of a code word 10 in one embodiment. As shown in Table 50A, this particular code word 10 may be correct when it has a value "0000000." Accordingly, when this code word is input to decoder 300, syndrome generator 304 may output syndrome '000.' Each other entry in the table shows code word 10 with a single-bit error at a particular bit position. Syndrome generator 304 may generate a unique syndrome that corresponds to each bit position within code word 10 whenever an error is detected at that bit position. The erroneous bit position identified by each syndrome shown in Table 50A may correspond to the column for that bit position in parity check matrix 20 shown in FIG. 4B. For example, if an error is introduced at bit position d3 (as shown in the fifth line of Table 50A), syndrome 16 equals "011." Looking back at FIG. 4B, this syndrome equals d3's column (reading from top to bottom) in parity check matrix 20. For each other possible bit position in code word 10, a different syndrome 16 may be generated to identify an error at that bit position. Thus, the syndrome 16 identifies which bit position, if any, is erroneous.

The original data bits 12 and the syndrome 16 generated by syndrome generator 304 are input to error detection/correction unit 306. In the illustrated embodiment, error detection/correction unit 306 may include a demultiplexer 308, and OR network 312, and an XOR network 310. Based on the syndrome output by syndrome generator 304, demultiplexer 308 may output a 7-bit value. Each bit in demultiplexer 308's output may indicate whether an error was detected at a corresponding bit position within code word 10. For example, each bit output by demultiplexer 308 may be '0' if no errors were detected. If an error was detected at a particular bit position in code word 10, demultiplexer 308 may output a '1' for the bit corresponding to that bit position and a '0' for each other bit. If any of the bits output by demultiplexer 308 are '1' (indicating that an error was detected), OR gate 312 may assert the single error/detected corrected signal 18.

The four bits within demultiplexer 308's output that correspond to the data bits 12 within code word 10 may be used to correct any errors detected within the data bits 12. Note that since only the data bits 12 are desired as an output in this embodiment, only the data bits 12 are corrected. Other embodiments may correct the entire code word 10.

As shown in the illustrated embodiment, an XOR network 310 may be used to correct data bits 12. Each of the bits output from demultiplexer 308 that correspond to one of the data bits 12 may be input to the XOR network 310 and XORed with its corresponding data bit 12. If no errors were detected, each bit from decoder may be '0,' and thus the data bits 12 may pass through the XOR network 310 unmodified (since X XOR 0=X). However, if an error is detected in one of the data bits 12, the bit output by demultiplexer 308 that corresponds to the erroneous data bit may be 1. When the erroneous data bit and the corresponding bit output from demultiplexer 308 pass through the XOR network 310, the erroneous data bit may be inverted (since X XOR 1=X'). Thus, the XOR network may use the output from demultiplexer 308 to correct errors detected within data bits 12.

FIG. 6B shows the check bit equations 22A that may be used by check bit generator 102 to generate the new set of check bits 14A from the data bits 12 within code word 10. These equations are the same as the equations used to generate the original check bits 14 in code word 10. FIG. 6B also shows the syndrome equations 24 used by syndrome generator 304 to generate syndrome 16. Finally, Table 50A shows how a unique syndrome 16 may be generated for each possible bit position in code word 10 if that bit position is erroneous. If code word 10 is correct when input to Hamming decoder 300, a syndrome indicating that no errors were detected (in FIG. 6B, this syndrome equals '000') may be generated. Accordingly, demultiplexer 308 may output all zeroes, and thus the error signal may not be asserted and data bits 12 may pass through XOR network 310 without being modified.

In some embodiments, a SECDED Hamming code (or a similar code that provides even higher levels of error detection and/or correction) may be used. FIG. 6C shows an example of the check bit equations 22A that may be used to produce the regenerated check bits 14A in such an embodiment. In this embodiment, the check bit equations 22A used to generate the new check bits 14A in the Hamming decoder may be the same as the check bit equations 22 used by the Hamming encoder 100A in FIG. 4F. Table 50B shows how the syndrome generator may generate a unique syndrome to identify each possible erroneous bit position, if any, in code word 10. For example, if code word 10 is correct when input to Hamming decoder 300A, syndrome '0000' may be generated to indicate that no errors were detected. Double-error detection in such a decoder is described with respect to FIGS. 8A–8B.

FIG. 7 shows one embodiment of a method of testing a decoder such as Hamming decoder 300. Note that while the functional blocks 701–711 are arranged in a certain order in the illustrated embodiment, this arrangement is merely illustrative and does not imply that the method requires any particular temporal order. Other embodiments may order the functional blocks differently.

A decoder may be tested by creating a set of test code words, as shown at 701 and 703. One test code word may be a correct code word, as shown at 701. Each other test code word may be created by introducing a single bit error at a particular bit position within the correct test code word, as shown at 703. These other test code words may collectively contain single bit errors at each bit position within the code word. In one embodiment, a set of test data may be created by setting an initial set of test data bits to the same value (e.g., all zeros or all ones) and generating the check bits that correspond to those test data bits to create a test code word. Accordingly, in some embodiments, each bit within the initial test code word may have the same value (e.g., all zeros or all ones). Subsequent test code words containing single bit errors at each bit position in the code word may be created by shifting or "walking" a single bit having a value (e.g., one or zero) opposite of the value (e.g., zero or one) of the correct bits across each bit position in the initial code word. Each time the opposite bit value is shifted, a new test code word may be created. As Tables 50A and 50B show, the set of test code words may contain n+1 code words, where n is the number of bits in each code word.

Each test code word may be provided to the decoder being tested, as shown at 705. Testing a decoder may involve providing each test code word to the decoder and checking to see if the corrected (or, if the data bits were correct when input to the decoder, uncorrected) data bits are output, illustrated at 705 and 707. The output of the decoder may be compared to a known correct output for each test code word. For the test code words containing single-bit errors, the output should be the corrected data bits (e.g., all having the same value of either all zeros or all ones as used in the initial test code word) and an asserted single error detected/corrected signal. In one embodiment, the corrected data bits output by the decoder may have the same value for each test input (e.g., if '0000000' is the correct code word, '0000000' should be output in response to each test code word if the decoder is functioning properly). Testing may also involve checking to see if the single error detected/corrected signal is correctly asserted or deasserted for each particular test code word. This may test that a syndrome generator within the decoder can output each unique syndrome used for single error detection and correction. It may also test that a demultiplexer generates the proper output for each syndrome correctly, and that the logic used for error correction and for generating the single error detected/corrected signal is working properly. If the decoder does not output the corrected data bits and/or the correct single error detected/corrected signal, the decoder fails the test, as shown at 711. If the decoder properly corrects and/or detects the single bit errors, the decoder passes the test, as illustrated at 709.

Figure 8A:
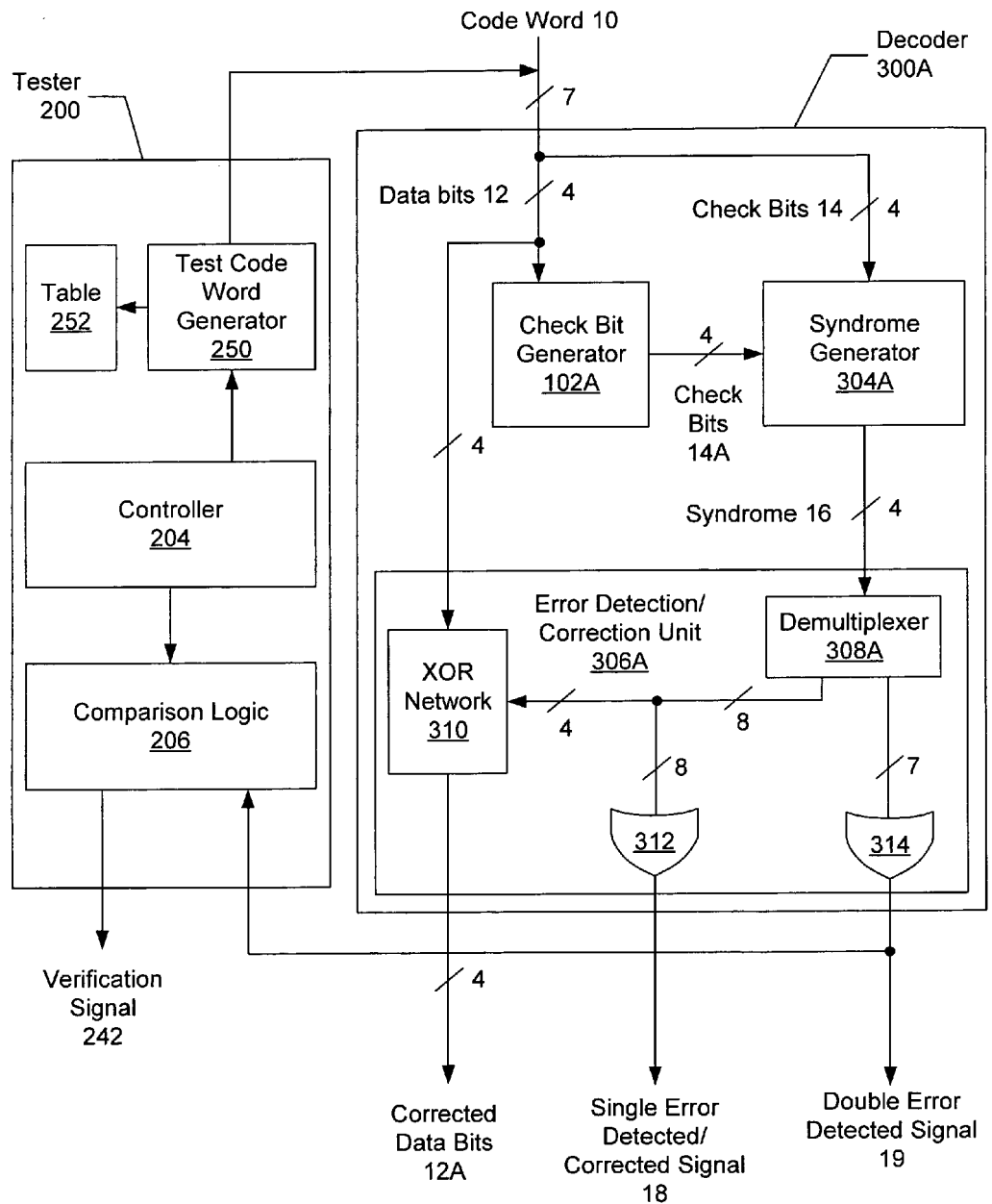

FIG. 8A shows one embodiment of a SECDED Hamming decoder 300A. In addition to detecting and correcting single-bit errors, Hamming decoder 300A also detects double-bit errors. As shown in FIG. 4G, a double-error detecting Hamming code has more potential columns for the data bit columns in parity check matrix 20A than are actually used. For example, in FIG. 4G, the columns having the encoded values of 3, 5, 6, 9, 10, 12, and 15 are not used in parity check matrix 20A. Since these columns do not correspond to any of the columns in the parity check matrix, when they are generated as syndromes, it indicates that a double-bit error has been detected. In contrast, single-bit errors are detected when a column that was used in the parity check matrix is generated as a syndrome. Throughout this disclosure, the syndromes that correspond to the columns that are not used in the parity check matrix for a particular error code are referred to as unused syndromes. Unused syndromes identify double-bit errors. The unused syndromes present in each embodiment depend on the particular parity check matrix and check bit equations used in that embodiment.

Hamming decoder 300A receives a code word 10 as an input and uses check bit generator 102A to generate a new set of check bits 14A for the data bits 12 in that code word 10. The new check bits 14A and the original check bits 14 in code word 10 are input to syndrome generator 304A. Syndrome generator 304A outputs a syndrome 16 to error detection/correction unit 306A. FIG. 6C shows the equations that may be used by the check bit generator 102A and syndrome generator 304A. Tables 60 and 70 in FIG. 8B illustrate the used syndromes and unused syndromes that may be generated in one embodiment of decoder 300A.

The syndrome 16 and the data bits 12 may be input to error detection/correction unit 306A. Like error detection/correction unit 306 in FIG. 6A, error detection/correction unit 306 may use demultiplexer 308A, OR logic 312, and XOR network 310 to correct detected single-bit errors. Additionally, error detection/correction unit 306 may use demultiplexer 308A and OR logic 314 to identify situations where a double-bit error has been detected. In the illustrated embodiment, demultiplexer 308A may be configured to output 15 bits. Each bit may either identify an error at a particular bit position (e.g., if a used syndrome is input to demultiplexer 308A) or identify that a double-bit error has been detected (e.g., if a corresponding unused syndrome is input to demultiplexer 308A). The bits in demultiplexer 308A's output that correspond to double-bit errors may be provided to OR logic 314 to generate the proper value of the double-bit error detected signal 19. Thus, if one of the bits indicating that a double-bit error was detected is asserted, the double-bit error detected signal 19 may be asserted. Generally, more than two errors may be present in a code word that causes the double-bit error detected signal 19 to be asserted, but for convenience, these errors are referred to as double-bit errors throughout.

FIG. 8A also shows a tester 200, which may be implemented as a hardware tester and/or a software tester in various embodiments. Tester 200 includes controller 204, which is coupled to control test code word generator 250 and comparison logic 206. Test code word generator 250 may be configured to generate test code words that cause syndrome generator 304A to generate each unused syndrome and to provide these test code words to Hamming decoder 300A. In one embodiment, a set of test code words may be constructed by encoding an initial set of data bits that each have the same value (e.g., zero or one) into an initial code word by generating a set of check bits. Accordingly, each bit in the initial code word may have the same logical value in some embodiments. The check bits in the initial code word may be replaced with check bits that cause an unused syndrome to be generated by the syndrome generator when the modified code word is input to the Hamming decoder. Test code word generator 250 may select the check bits that correspond to an unused syndrome from table 252.

If the bits in initial code word each equal zero, the check bits may be replaced with the bits in the unused syndromes (e.g., in one embodiment, the unused syndromes may be those shown in Table 70 in FIG. 8B). The new check bits generated in the Hamming decoder will each be zero (since 0 XOR 0=0). The syndrome generator will XOR each new check bit with the corresponding check bit in the test code word, so the syndrome generated by the syndrome generator should be the unused syndrome (since X XOR 0=X). Similarly, if the bits in the initial code word each equal one, the check bits may be replaced with inverted copies of the bits in the unused syndromes (e.g., an inverted copy of the bits in the unused syndrome '0011' would be '1100') in order to cause the syndrome generator to generate the unused syndromes. Each time the check bits in the test code word are replaced with a set of check bits corresponding to another unused syndrome, the resulting test code word may be added to the set of test data used to test the Hamming decoder. Thus, there may be as many test code words as there are unused syndromes.

The number of unused syndromes present in a particular embodiment depends on the size of the code word and the number of check bits used. For example, if 64 data bits are encoded into a 72-bit code word (i.e., there are eight check bits), there may be 73 used syndromes (one for each bit position in the code word plus the zero syndrome to indicate no errors were detected) and 183 unused syndromes (256 (i.e., $2^8$)–73=183).

Tester 200 may include comparison logic 206 configured to compare the output of the decoder 300A to known correct output for the test code words provided to the decoder 300A by test code word generator 250. The comparison logic may be configured to compare the double-error detected signal 19 generated by the decoder in response to the test code words with the correct values of the double-error detected signal for those test code words. Based on the result of the comparison, comparison logic 206 may output a verification signal 222 indicating whether decoder 300A's double-error detection is working properly.

Figure 9:
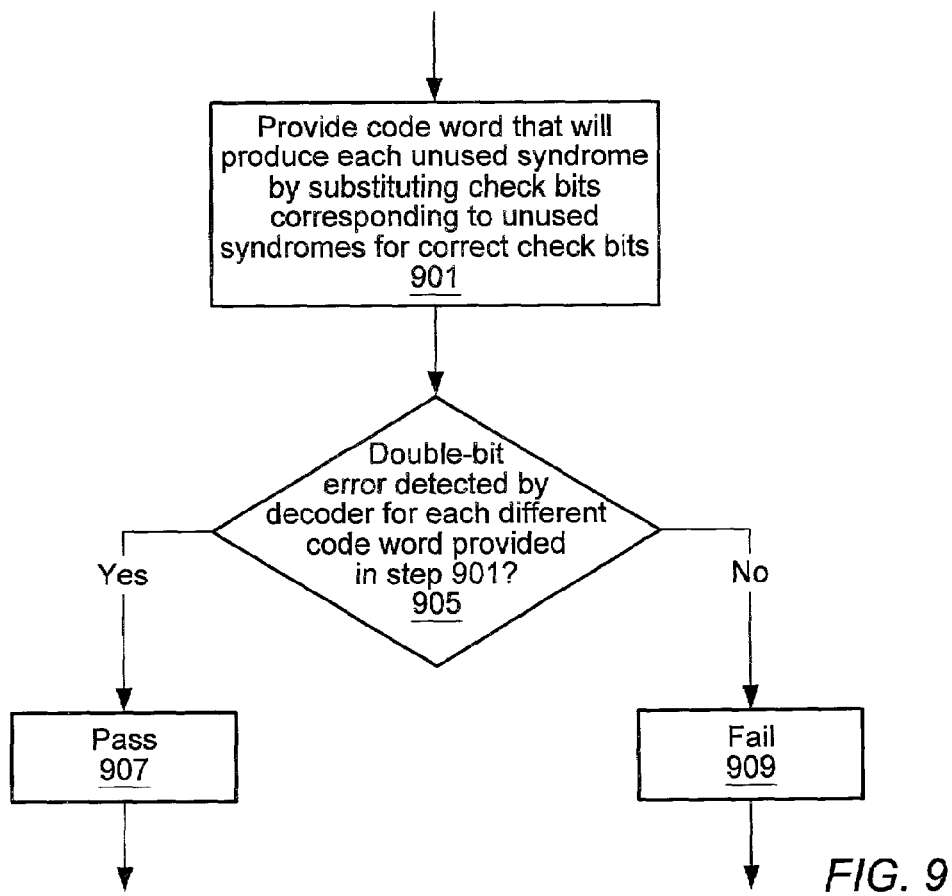
FIG. 9 is a flowchart of one embodiment of a method of testing error detection/correction logic.

FIG. 9 shows one embodiment of a method of testing a SECDED Hamming decoder for proper double-error detection. In FIG. 9, a set of code words is provided as test input, as shown at 901. The set of code words includes a code word that will produce each unused syndrome. These code words may be created by substituting check bits corresponding to the unused syndromes for the correct check bits. For example, if the bits in the correct code word all equal zero, the test code words may be created by substituting the unused syndromes for the correct check bits.

If the decoder detects a double-bit error for each of the test code words provided in step 901, the decoder passes the test, as shown at 905 and 907. If the decoder does not detect a double-bit error for each test code word, the decoder fails the test, as shown at 905 and 909.

Figure 10:
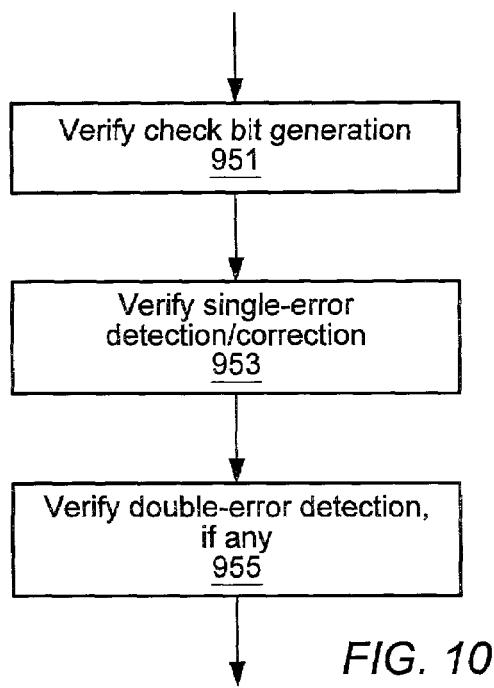
FIG. 10 is a flowchart of another embodiment of a method of testing error detection/correction logic.

FIG. 10 shows one embodiment of a method of testing a Hamming encoder/decoder. In step 951, the check bit generator in the Hamming encoder/decoder may be verified. For example, the check bit generator may be verified using the method shown in FIG. 5. In step 953, the single-error detection/detection correction may be verified. For example, step 953 may involve performing a test using the method shown in FIG. 7. The double-error detection, if any, may be verified in step 955. In some embodiments, it may be desirable to perform step 951 before steps 953 or 955 since the operation of the single- and double-error detection logic may depend on the check bit generation logic operating properly.

Numerous variations and modifications will become apparent to those skilled in the art once the above disclosure is fully appreciated. For example, while various embodiments of a tester and a method of testing error detection/correction logic have been described primarily in the context of testing Hamming encoders/decoders, it is noted that similar embodiments may be used to test other types of error detection/correction logic. It is intended that the following claims be interpreted to embrace all such variations and modifications.

What is claimed is:

1. A method of testing error correction/detection logic, the method comprising:
    creating an initial data bit combination having n bits, wherein each data bit in the initial data bit combination has a same logical value as each other data bit in the initial data bit combination;
    shifting a first bit having a different logical value than the same logical value across the initial data bit combination, wherein each time the first bit is shifted, one of n data bit combinations is generated;
    providing each of the n data bit combinations to the error detection/correction logic;
    in response to said providing, the error detection/correction logic generating a set of check bits for each of the n data bit combinations;
    comparing the set of check bits generated by the error correction/detection logic with a known correct set of check bits for each of the n data bit combinations; and
    dependent on an outcome of said comparing, generating an indication of whether the error detection/correction logic correctly generated the set of check bits.

2. The method of claim 1, wherein the error detection/correction logic comprises a Hamming code encoder and a Hamming code decoder.

3. The method of claim 1, further comprising:
    providing a set of m+1 test code words to the error correction/detection logic, wherein each code word has m bits, wherein a first test code word in the set of m+1 test code words is a correct code word, wherein each test code word other than the first test code word comprises a single-bit error at a different bit position within the code word than each other test code word;
    in response to said providing, the error correction/detection logic decoding the set of m+1 test code words; and
    verifying that the error correction/detection logic correctly decoded each of the m+1 test code words.

4. The method of claim 3, wherein each bit in the first test code word has a same logical value, and wherein each test code word other than the first test code word comprises a bit having an opposite logical value at the different bit position.

5. The method of claim 4, wherein said providing a set of m+1 test code words comprises shifting the bit having the opposite logical value across the first test code word, wherein each time the bit is shifted, one of the test code words other than the first test code word is created.

6. The method of claim 3, wherein said verifying that the error correction/detection logic correctly decoded each of the m+1 test code words comprises verifying that the error correction/detection logic detects each of the single-bit errors.

7. The method of claim 3, wherein said verifying that the error correction/detection logic correctly decoded each of the m+1 test code words comprises verifying that the error correction/detection logic corrects each of the single-bit errors that occurs in a data bit within each of the m+1 test code words.

8. The method of claim 3, wherein said verifying that the error correction/detection logic correctly decoded each of the m+1 test code words comprises verifying that the error correction/detection logic indicates that the first test code word is correct in response to being provided with the first test code word.

9. The method of claim 1, further comprising:
   providing a set of test code words to the error correction/detection logic, wherein an error has been introduced into each of the test code words in the set by substituting check bits corresponding to an unused syndrome for a correct set of check bits within each test code word, wherein each test code word comprises substituted check bits corresponding to a different unused syndrome than each other test code word in the set of test code words;
   in response to said providing, the error correction/detection logic decoding each test code word in the set of test code words; and
   verifying that the error correction/detection logic correctly identified the error in each of the test code words.

10. The method of claim 9, wherein said providing a set of test code words comprises creating an initial code word, wherein each bit in the initial code word has a same logical value.

11. The method of claim 10, wherein the same logical value is a logical 0, and wherein the substituted check bits in each code word equal a set of bits in one of the unused syndromes.

12. The method of claim 10, wherein the same logical value is a logical 1, and wherein each bit in the substituted check bits in each code word equals an inverse logical value of each bit in one of the unused syndromes.

13. A computer readable medium comprising program instructions computer-executable to:
   create an initial data bit combination having n bits, wherein each data bit in the initial data bit combination has a same logical value as each other data bit in the initial data bit combination;
   shift a first bit having a different logical value than the same logical value across the initial data bit combination, wherein each time the first bit is shifted, one of n data bit combinations is generated;
   provide each of the n data bit combinations to error detection/correction logic;
   compare a set of check bits generated by the error correction/detection logic with a known correct set of check bits for each of the n data bit combinations; and
   dependent on an outcome of said comparing, generate an indication of whether the error detection/correction logic correctly generated the set of check bits.

14. The computer readable medium of claim 13, further comprising program instructions computer-executable to:
   provide a set of m+1 test code words to the error correction/detection logic, wherein each code word has m bits, wherein a first test code word in the set of m+1 test code words is a correct code word, wherein each test code word other than the first test code word comprises a single-bit error at a different bit position within the code word than each other test code word; and
   verify that the error correction/detection logic correctly decoded each of the m+1 test code words.

15. The computer readable medium of claim 14, wherein each bit in the first test code word has a same logical value, and wherein each test code word other than the first test code word comprises a bit having an opposite logical value at the different bit position.

16. The computer readable medium of claim 15, further comprising program instructions computer-executable to shift the bit having the opposite logical value across the first test code word, wherein each time the bit is shifted, one of the test code words other than the first test code word is created.

17. The computer readable medium of claim 15, further comprising program instructions computer-executable to verify that the error correction/detection logic corrects each of the single-bit errors that occurs in a data bit within each of the m+1 test code words.

18. The computer readable medium of claim 14, further comprising program instructions computer-executable to verify that the error correction/detection logic detects each of the single-bit errors.

19. The computer readable medium of claim 14, further comprising program instructions computer-executable to verify that the error correction/detection logic indicates that the first test code word is correct in response to being provided with the first test code word.

20. The computer readable medium of claim 13, further comprising program instructions computer-executable to:
   provide a set of test code words to the error correction/detection logic, wherein an error has been introduced into each of the test code words in the set by substituting check bits corresponding to an unused syndrome for a correct set of check bits within each test code word, wherein each test code word comprises substituted check bits corresponding to a different unused syndrome than each other test code word in the set of test code words; and
   verify that the error correction/detection logic correctly identified the error in each of the test code words.

21. The computer readable medium of claim 20, further comprising program instructions computer-executable to create an initial code word, wherein each bit in the initial code word has a same logical value.

22. The computer readable medium of claim 21, wherein the same logical value is a logical 0, and wherein the substituted check bits in each code word equal a set of bits in one of the unused syndromes.

23. The computer readable medium of claim 21, wherein the same logical value is a logical 1, and wherein each bit in the substituted check bits in each code word equals an inverse logical value of each bit in one of the unused syndromes.

24. A tester for testing error correction/detection logic, the tester comprising:
   test check bit generating means for creating a set of test data bit combinations and providing the set of test data bit combinations to a check bit generator comprised in the error correction/detection logic, wherein the set of test data bit combinations comprises n n-bit data bit combinations, wherein each possible logical value of each data bit is present in at least one of the n n-bit data bit combinations in the set of test data bit combinations;
   comparison means for comparing check bits output by the error correction/detection logic for each of the n n-bit data bit combinations in the set of test data bit combinations to known correct check bits for each of the n n-bit data bit combinations; and
   indication means for generating an indication as to whether the check bits output by the error correction/detection logic are correct based on an output of the comparison means.

25. The tester of claim 24, further comprising:
   test code word generating means for creating a set of test code words and providing the set of test code words to the error correction/detection logic, wherein the set of test code words comprises m+1 in-bit test code words, wherein a first test code word is a correct code word, and wherein each other test code word comprises a single-bit error, and wherein each of the other test code words comprises the single-bit error at a different bit position than any other of the other test code words;

wherein the comparison means are further for comparing an output of the error correction/detection logic with a known correct output for each test code word in the set of test code words.

26. The tester of claim 24, further comprising:

test code word generating means for creating a set of test code words and providing the set of test code words to the error correction/detection logic, wherein an error has been introduced into each of the test code words in the set by substituting check bits corresponding to an unused syndrome for a correct set of check bits within each test code word, wherein each test code word comprises substituted check bits corresponding to a different unused syndrome than each other test code word in the set of test code words;

wherein the comparison means are further for comparing an output of the error correction/detection logic to a known correct output for each of the test code words.

27. A method of testing error correction/detection logic, the method comprising:

providing a set of m+1 test code words to the error correction/detection logic, wherein each code word has m bits, wherein a first test code word in the set of m+1 test code words is a correct code word, wherein each test code word other than the first test code word comprises a single-bit error at a different bit position within the code word than each other test code word;

in response to said providing, the error correction/detection logic decoding the set of m+1 test code words; and verifying that the error correction/detection logic correctly decoded each of the m+1 test code words.

28. The method of claim 27, wherein each bit in the first test code word has a same logical value, and wherein each test code word other than the first test code word comprises a bit having an opposite logical value at the different bit position.

29. The method of claim 28, wherein said providing comprises shifting the bit having the opposite logical value across the first test code word, wherein each time the bit is shifted, one of the test code words other than the first test code word is created.

30. A method of testing error correction/detection logic, the method comprising:

providing a set of test code words to the error correction/detection logic, wherein said providing comprises introducing an error into each of the test code words in the set by substituting check bits corresponding to an unused syndrome for a correct set of check bits within each test code word, wherein each test code word comprises substituted check bits corresponding to a different unused syndrome than each other test code word in the set of test code words;

in response to said providing, the error correction/detection logic decoding each test code word in the set of test code words; and verifying that the error correction/detection logic correctly identified the error in each of the test code words.

31. The method of claim 30, wherein said providing comprises creating an initial code word, wherein each bit in the initial code word has a same logical value.

32. The method of claim 31, wherein the same logical value is a logical 0, and wherein the substituted check bits in each code word equal a set of bits in one of the unused syndromes.

33. The method of claim 31, wherein the same logical value is a logical 1, and wherein each bit in the substituted check bits in each code word equals an inverse logical value of each bit in one of the unused syndromes.

34. A data processing system comprising:

a storage array comprising at least one mass storage device;

a host computer system coupled to provide data to the storage array; and error correction/detection logic configured to generate check bits for the data being provided to the storage array;

wherein the host computer system is configured to test the error correction/detection logic by providing each of a set of n data bit combinations to the error detection/correction logic, wherein each data bit combination has n bits, wherein each possible value of each data bit is present in at least one of the n data bit combinations, wherein the set of n data bit combinations provided to the error detection/correction logic is a subset of a set of all data bit combinations that it is possible to create using n bits;

wherein in response to being provided with the set of n data bit combinations, the error detection/correction logic is configured to generate a set of check bits for each of the n data bit combinations; and wherein the host computer system is configured to compare the set of check bits generated by the error correction/detection logic with a known correct set of check bits for each of the n data bit combinations.

35. A method of testing error detection/correction logic, the method comprising:

providing a subset of possible data bit combinations of n data bits to the error detection/correction logic, wherein the subset comprises n data bit combinations, wherein each possible value of each data bit is present in at least one of the n data bit combinations in the subset;

verifying the error detection/correction logic by comparing a set of check bits generated by the error detection/correction logic for each of the n data bit combinations in the subset with a set of known correct check bits;

providing a first set of m+1 test code words to the error detection/correction logic, wherein a first test code word is a correct test code word and where each other test code word in the set of m+1 test code words comprises a single-bit error, wherein each test code word having a single-bit error has the single-bit error at a different bit position than each other test code word that has a single-bit error;

wherein said verifying further comprises comparing a first output of the error detection/correction logic generated in response to said providing a first set of m+1 test code words with a first known correct output for each of the m+1 test code words;

providing a second set of test code words to the error detection/correction logic, wherein each test code word in the second set comprises an error introduced by substituting check bits corresponding to an unused syndrome for a correct set of check bits within a correct code word, wherein each test code word in the second set comprises substituted check bits corresponding to a different unused syndrome than each other test code word in the second set of test code words;

wherein said verifying further comprises comparing a second output of the error detection/correction logic generated in response to said providing a second set of test code words with a second known correct output for each of the m+1 test code words; and in response to said verifying, indicating whether the error detection/correction logic is operating properly.

* * * * *

UNITED STATES PATENT AND TRADEMARK OFFICE
CERTIFICATE OF CORRECTION

PATENT NO. : 7,020,811 B2
APPLICATION NO. : 10/037361
DATED : March 28, 2006
INVENTOR(S) : Byrd It is certified that error appears in the above-identified patent and that said Letters Patent is hereby corrected as shown below:

Column 18,

Line 64, please delete "test code words comprises m+1 in-bit test code words," and substitute -- test code words comprises m+1 m-bit test code words--

Signed and Sealed this

Eighteenth Day of July, 2006

JON W. DUDAS
*Director of the United States Patent and Trademark Office*